United States Patent Office 3,531,407
Patented Sept. 29, 1970

3,531,407
FOAM COMPATIBLE FIRE-EXTINGUISHING POWDERS CONTAINING COPPER PHTHALOCYANINE OR ONE OF ITS DERIVATIVES
David Arthur Phillips, Winnington, Northwich, and John Lewis Milliet, Blackley, Manchester, England, assignors to Imperial Chemical Industries Limited, Millbank, London, England, a corporation of Great Britain
No Drawing. Filed Nov. 15, 1968, Ser. No. 776,260
Claims priority, application Great Britain, Nov. 28, 1967, 54,121/67
Int. Cl. A62d 1/00
U.S. Cl. 252—2　　　　　　　　　　　　　　6 Claims

ABSTRACT OF THE DISCLOSURE

To render powdered fire-extinguishing agents compatible with fire-extinguishing foams, for example, foams based on proteins, a minor proportion of copper phthalocyanine or one of its derivatives is incorporated in the powder. Examples of foam-compatible compositions so obtained are mixtures of sodium bicarbonate or potassium bicarbonate, or the fire-extinguishing agent made by heating urea with potassium bicarbonate below 150° C., with copper phthalocyanine the proportion of the latter in the mixture being 0.01 to 10% by weight. Free-flowing and anti-caking agents may be included in the foam-compatible compositions.

---

This invention relates to fire-extinguishing compositions of the dry powder type and particularly to those having compatibility with protein-stabilised mechanical foams.

Dry sodium and potassium bicarbonates and dry powdered materials based on or derived from them are efficient agents for extinguishing fires including liquid fuel fires. They possess good heat-shielding properties and rapidly generate an atmosphere unfavourable to flame propagation. These properties make them desirable for use together with mechanical foams, for example protein-based foam, in attacking hydrocarbon fires, for example those associated with aircraft.

However these powdered materials are sometimes incompatible with mechanical foams in that when the two are applied together under fire-fighting conditions the foam blanket collapses almost as soon as it comes into contact with the burning fuel. This collapse may be caused by the powders dissolving in contact with water in the foam and thereby producing ions, possible hydroxyl ions, that disrupt the stabilising protein films at the surfaces of the bubbles. Surface-active agents, for example stearic acid and metal stearates, present in the dry powders for the purpose of keeping them free-flowing tend to encourage this disrupting action.

Surface-active agents of the type mentioned can be replaced by polysiloxanes, which have no effect on the foam and which impart water-repelling properties to the powders, but in spite of this some dissolution does occur and gives rise to ions that still lead to an unacceptably high rate of breakdown of foam.

If a substance could be found that stabilised foam in presence of ions derived from the powder it would be possible by mixing it with the powder to prevent foam-breakdown due to the powder or at least reduce its extent to an acceptable level.

We have found that certain hydrophobic pigments, particularly copper phthalocyanine and some of its derivatives, when mixed in a finely divided state with the dry powder exert the desired stabilising effect.

The invention thus in its general form provides dry, powdered fire-extinguishing compositions suitable for use together with foams in combating fires characterised in that said compositions contain a minor proportion by weight of finely-divided copper phthalocyanine or of a derivative thereof.

In one particular form the invention provides dry, powdered fire-extinguishing compositions comprising an alkali metal bicarbonate and a minor proportion by weight of finely divided copper phthalocyanine or of a derivative thereof, the alkali metal being selected from sodium and potassium.

In yet another particular form the invention provides dry, powdered fire-extinguishing compositions comprising one or more of the compositions of matter made by heating a mixture of urea and at least one alkali selected from bicarbonates, sesquicarbonates, carbonates and hydroxides of sodium and potassium at temperatures below 150° C., as described in application S.N. 676,907, filed Oct. 21, 1967, and a minor proportion by weight of finely divided copper phthalocyanine or of a derivative thereof.

By a minor proportion is to be understood that from 0.01% to 10.0% by weight of the dry, powdered fire-extinguishing composition consists of copper phthalocyanine or of a derivative thereof.

Copper phthalocyanine is the preferred phthalocyanine but copper polychlorophthalocyanine and copper phthalocyanines containing long alkyl chains may also be used. Free-flowing and anti-caking additives may be included in the compositions of the invention, for example finely-divided silica, polysiloxanes.

An example of a dry, powdered fire-extinguishing composition according to the invention and also containing anti-caking and free-flowing agents is as follows; all parts are by weight:

| Parts | |
|---|---|
| Substance A | 900–990 |
| Finely-divided silica | 5–100 |
| A polysiloxane | 1–20 |
| Copper phthalocyanine | 1–50 | in which substance A represents sodium bicarbonate, or potassium bicarbonate or one of the compositions described in application S.N. 676,907.

Foam compatibility can conveniently be measured by the method described in U.S. Naval Research Laboratory report No. NRL 5329 by E. J. Jablonski and R. L. Gipe dated June 23, 1959—"A New Method for Determining the Degree of Compatibility of Dry Chemical Powders With Mechanical Foams." Briefly the method measures average drainage-rates of liquid from foam, and a material is considered to be compatible with a foam if the average drainage-rate of a standard foam dusted with a standard weight of the material is no greater than twice the drainage-rate of foam alone.

The invention is illustrated by the data given in Tables 1 and 2, which comprise the results of foam compatibility tests carried out according to the method referred to hereinbefore. Table 1 contains the results obtained with dry, powdered sodium bicarbonate, potassium bicarbonate, and substance K which is the material obtained by heating potassium bicarbonate with urea at a temperature below 150° C. as described in application S.N. 676,907, each of these three fire-extinguishing materials containing 1% by weight of copper phthalocyanine; the foam was made from a protein-type concentrate. Other results obtained in the absence of copper phthalocyanine are included for comparison. The silica was a finely divided proprietary material having an average particle-size less than 50 millimicrons, the surfactant was calcium stearate and the polysiloxane was substantially tetramethylcyclotetrasiloxane. These three substances were present to give free-flowing and anti-caking properties to the mixtures. The numbers in the columns of the table headed by the respective powdered fire-extinguishing materials are the ratios of average drainage-rate of foam plus material to average drainage-rate of foam alone. The column headed "additive" shows the substances added to the foam/dry powdered material system. Percentage are by weight.

TABLE 1

| Additive | Dry powdered material | | |
|---|---|---|---|
| | NaHCO$_3$ | KHCO$_3$ | Substance K |
| Nil | 3.7 | 8.2 | 6.4 |
| 2% silica | 7.0 | 9.3 | 8.6 |
| 2% silica and 1% surfactant | 17.1 | 14.2 | 13.7 |
| 2% silica and 1% polysiloxane | 2.1 | 2.8 | 2.6 |
| 2% silica and 1% copper phthalocyanine | 1.3 | 1.8 | 1.7 |

Table 2, in which percentages are by weight, shows the results of further foam compatibility tests carried out with mixtures of substance K and copper phthalocyanine, and, for comparison, mixtures of substances K and various other additives that might be expected to possess foam-stabilising properties, among which the polysiloxane was substantially tetramethylcyclotetrasiloxane, and the silicone-treated silica was a finely-divided proprietary silica having an average particle-size less than 50 millimicrons and containing 20% by weight of a silicone. The ratios in the right hand column are of drainage-rates of foam plus substance K plus additive to drainage-rate of foam alone.

TABLE 2

| Additive: | Ratio of drainage rates |
|---|---|
| Nil | 8.7 |
| 0.5% copper phthalocyanine | 2.3 |
| 1.0% copper phthalocyanine | 1.9 |
| 1.5% copper phthalocyanine | 1.6 |
| 2.0% copper phthalocyanine | 2.8 |
| 2.0% talc | 6.0 |
| 2.0% polysiloxane | 5.0 |
| 2.0% silicone-treated silica | 4.0 |
| 5.0% copper acetate | 3.0 |
| 5.0% ferric acetate | 4.0 |
| 5.0% ferric oxide | 13.0 |

What we claim is:

1. A dry, powdered fire-extinguishing composition suitable for use together with foams in combating fires comprising a mixture of a dry, powdered fire-extinguishing agent selected from sodium bicarbonate, potassium bicarbonate and the material made by heating a mixture of urea and at least one alkali selected from bicarbonates, sesquicarbonates, carbonates and hydroxides of sodium and potassium at temperatures below 150° C. and a finely divided copper compound selected from copper phthalocyanine, copper polychlorophthalocyanine and copper phthalocyanines substituted with long alkyl chains, the proportion of said copper compound being from 0.01% to 10% by weight.

2. A dry, powdered fire-extinguishing composition as claimed in claim 1 that also contains free-flowing and anti-caking agents.

3. A dry, powdered fire-extinguishing composition as claimed in claim 2 in which the free-flowing and anti-caking agents are selected from finely divided silica, silicones, finely divided silica containing silicones, polysiloxanes, calcium stearate.

4. A finely divided fire-extinguishing composition as claimed in claim 1 comprising a mixture of the fire-extinguishing agent made by heating a mixture of urea and at least one alkali selected from bicarbonates, sesquicarbonates, carbonates, and hydroxides of sodium and potassium at temperatures below 150° C. and copper phthalocyanine.

5. A finely-divided fire-extinguishing composition as claimed in claim 4 in which the alkali with which urea is heated to make the fire-extinguishing agent is potassium bicarbonate.

6. A finely divided fire-extinguishing composition as claimed in claim 5 in which the proportion of copper phthalocyanine is from 0.10 to 5.0% by weight.

References Cited

UNITED STATES PATENTS 2,767,141  10/1956  Ratzer et al. _____ 252—8.05
3,257,316  6/1966  Langguth et al. _____ 252—7

FOREIGN PATENTS 235,072  11/1960  Australia.

JOHN T. GOOLKASIAN, Primary Examiner

D. J. FRITSCH, Assistant Examiner

U.S. Cl. X.R.

252—7, 8.05

PO-1050
(5/69)

UNITED STATES PATENT OFFICE
CERTIFICATE OF CORRECTION

Patent No. 3,531,407     Dated September 29, 1970

Inventor(s) Phillips, David Arthur and Moilliet, John Lewis

It is certified that error appears in the above-identified patent and that said Letters Patent are hereby corrected as shown below:

The second inventor's name is spelled "Milliet" on the face of the patent. This should be spelled Moilliet.

SIGNED AND
SEALED
DEC 15 1970

(SEAL)
Attest:

Edward M. Fletcher, Jr.
Attesting Officer

WILLIAM E. SCHUYLER, JR.
Commissioner of Patents